United States Patent
Freedman et al.

(10) Patent No.: US 6,765,990 B2
(45) Date of Patent: Jul. 20, 2004

(54) DATABASE DRIVEN METHODS AND SYSTEMS FOR REAL TIME CALL TRACING

(75) Inventors: Steven Michael Freedman, Raleigh, NC (US); Patrick Joseph Galizia, Cary, NC (US); Richard James Spangler, Raleigh, NC (US); Joseph Yu-Lung Wan, Richardson, TX (US)

(73) Assignee: Tekelec, Calabasas, CA (US)

( * ) Notice: Subject to any disclaimer, the term of this patent is extended or adjusted under 35 U.S.C. 154(b) by 0 days.

(21) Appl. No.: 10/325,225

(22) Filed: Dec. 19, 2002

(65) Prior Publication Data

US 2003/0142803 A1 Jul. 31, 2003

Related U.S. Application Data (60) Provisional application No. 60/342,573, filed on Dec. 20, 2001.

(51) Int. Cl.[7] ................................................ H04M 3/22
(52) U.S. Cl. ........................ 379/32.05; 379/126; 379/133
(58) Field of Search ...................... 379/32.01, 32.02, 379/32.03, 32.04, 32.05, 88.19, 213.01, 114.01, 112.01, 112.06, 126, 133, 246, 1.01, 111

(56) References Cited

U.S. PATENT DOCUMENTS

| | | |
|---|---|---|
| 4,464,543 A | 8/1984 | Kline et al. |
| 4,959,849 A | 9/1990 | Bhusri |
| 5,008,929 A | 4/1991 | Olsen et al. |
| 5,438,570 A | 8/1995 | Karras et al. |
| 5,592,530 A | 1/1997 | Brockman et al. |
| 5,638,431 A | 6/1997 | Everett et al. |
| 5,757,895 A | 5/1998 | Aridas et al. |
| 5,809,121 A | 9/1998 | Elliott et al. |
| 5,867,558 A * | 2/1999 | Swanson .................... 379/9.03 |
| 5,892,812 A * | 4/1999 | Pester, III ................ 379/32.02 |
| 5,999,616 A | 12/1999 | Fellner et al. |
| 6,137,876 A | 10/2000 | Wong et al. |
| 6,243,458 B1 | 6/2001 | Fellner et al. |
| 6,327,350 B1 | 12/2001 | Spangler et al. |
| 6,345,087 B1 | 2/2002 | Batham |
| 6,381,306 B1 | 4/2002 | Lawson et al. |
| 6,393,113 B1 | 5/2002 | Karras |
| 6,400,813 B1 | 6/2002 | Birnhak |
| 6,456,845 B1 | 9/2002 | Drum et al. |
| 6,483,907 B1 | 11/2002 | Wong et al. |
| 6,498,843 B1 | 12/2002 | Cox |
| 6,515,968 B1 | 2/2003 | Combar et al. |
| 6,539,082 B1 | 3/2003 | Lowe et al. |
| 2002/0071530 A1 | 6/2002 | Hannigan |
| 2002/0072358 A1 | 6/2002 | Schneider et al. |

OTHER PUBLICATIONS

Harry Newton, 1998, Newton's Telecom Dictionary, pp. 120–121, 237, 238 and 621.*

Tekelec, "Template Trap and Trace (TEMPMAST)," 910–5008–02, Tekelec TA, pp. i–7–52, (Feb. 1989).

* cited by examiner

*Primary Examiner*—Curtis Kuntz
*Assistant Examiner*—Barry W Taylor
(74) *Attorney, Agent, or Firm*—Jenkins, Wilson & Taylor, P.A.

(57) ABSTRACT

Database-driven methods and systems for database driven real time call tracing are disclosed. Signaling messages are copied from signaling link interface modules. The copied messages are sent to a database. A server located remotely from the database sends a query to the database for a real time call trace. The database is searched for messages that match the search criteria. If no messages are located in the historical data stored in the database, data entering the database is analyzed in real time.

36 Claims, 5 Drawing Sheets

DATABASE DRIVEN METHODS AND SYSTEMS FOR REAL TIME CALL TRACING

RELATED APPLICATIONS

This application claims the benefit of U.S. Provisional Patent Application Serial No. 60/342,573, filed Dec. 20, 2001, the disclosure of which is incorporated herein by reference in its entirety.

TECHNICAL FIELD

The present invention relates to methods and systems for real time call tracing. More particularly, the present invention relates to database driven methods and systems for real time call tracing.

RELATED ART

In order to diagnosis problems, detect fraud, and perform security screening in telecommunications networks, it is often necessary to capture, in real time, signaling messages used to establish, maintain, and tear down calls. The capturing of signaling messages relating to a call in real time is referred in the telecommunications industry as real time call tracing. Real time call tracing can be difficult because the signaling links that carry signaling messages may operate at different speeds and signaling messages relating to the same call may be sent over different links.

Conventional real time call tracing systems utilize signaling link probes to copy and buffer messages from signaling links. For example, U.S. patent application Publication No. US 2002/0071530 (hereinafter, "the '530 Publication") discloses a real time call tracing system that uses link probes copy messages from signaling links. Each link probe includes a probe buffer. Messages received from a signaling link are stored in the probe buffer. Trigger criteria are applied to the signaling messages stored in each probe buffer. If a signaling message stored in a probe buffer matches a trigger condition, the message is sent to an element manager associated with the probe that discovered the signaling message. The element manager formulates and sends a new trigger condition to each of the signaling link probes. Each of the signaling link probes analyzes messages in its probe buffer based on the new trigger criteria.

One problem with conventional real time call trace systems, such as that described in the '530 Publication, is that the memory and processing capacity of signaling link probe devices is limited. Because of the limited storage capacity at conventional signaling link probes, many conventional real time call trace systems utilize circular buffers at signaling link probes. Using circular buffers at signaling link probes allows data to be continuously written to a signaling link probe buffer. However, if data at the beginning of the buffer is not read before the buffer becomes full, the data will be overwritten with new data, and the signaling messages needed to perform a real time call trace may be lost.

Another problem with probe-buffer-based call tracing systems, such as that described in the '530 Publication, is that the systems do not truly operate in real time. For example, analyzing messages stored in a buffer means that the messages have already been received and are not being analyzed in real time as they arrive. Moreover, if a message is not found in the historical data stored in a buffer, the call trace may fail.

Yet another problem associated with conventional probe-buffer-based call tracing systems is that signaling link probe buffers may utilize volatile memory for storing received signaling messages. Storing these signaling messages in volatile memory will result in loss of data if a signaling link probe loses power.

Yet another problem associated with conventional probe-buffer-based call tracing systems is that link probes typically consist of dedicated message copying hardware with proprietary interfaces on the message analysis side. Using dedicated hardware with proprietary interfaces limits the ability to write real time call trace applications that interface with the hardware and have access to the messages stored in the signaling link buffers.

Accordingly, in light of these difficulties associated with conventional real time call tracing systems, there exists a need for improved methods and systems for real time call tracing.

DISCLOSURE OF THE INVENTION

The present invention includes improved methods and systems that use a database rather than link probe buffers for real time call tracing. In one exemplary implementation, the real time call tracing system is completely probeless. Messages are copied directly from signaling link interface cards in a signaling message routing node, such as a signal transfer point. The copied messages are sent to a network monitoring processor associated with the signal transfer point. The network monitoring processor stores the messages in a relational database. A network monitoring server located remotely from the network monitoring processor sends a request to the network monitoring processor for a real time call trace. The network monitoring processor searches the relational database for historical data copied from the signaling link for the message. If the message is not located in the historical data, the network monitoring processor analyzes messages in real-time as the message are received.

Utilizing a database, rather than link probe buffers, greatly increases the scalability, reliability, and flexibility of a real time call tracing system. For example, the database may be stored in memory on a general-purpose computing platform separate from signaling link probe hardware. Because the database can be located on any suitable general-purpose computing platform, the number of messages that can be buffered for real time call tracing purposes is scalable based on hard disk size. The reliability of the system is also increased because the database is stored in nonvolatile memory located on one or more system disks. The flexibility of the system is increased because the database can be located on any suitable network element at any suitable location in the network.

Accordingly, it is an object of the present invention to provide improved methods and systems for real time call tracing that utilize a database rather than link probe buffers for real time call tracing.

It is another object of the invention to provide a method for real time call tracing that combines the analysis of historical data stored in the database with data received in real time.

Some of the objects of the invention having been stated hereinabove, and which are addressed in whole or in part by the present invention, other objects will become evident as the description proceeds when taken in connection with the accompanying drawings as best described hereinbelow.

BRIEF DESCRIPTION OF THE DRAWINGS

Preferred embodiments of the invention will now be explained with reference to the accompanying drawings of which.

DETAILED DESCRIPTION OF THE INVENTION

Figure 1:
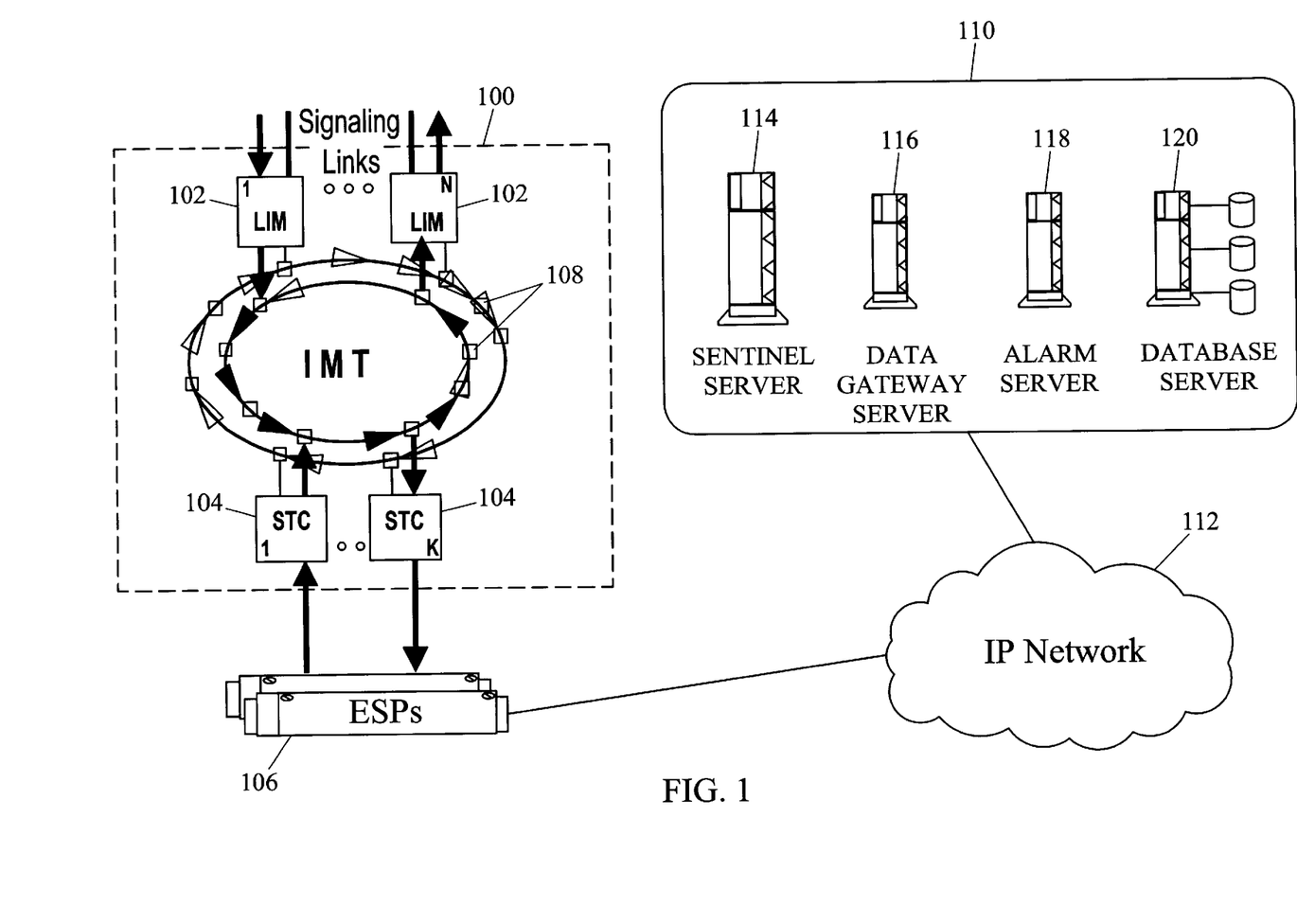
FIG. 1 is a block diagram of a database driven system for real time call tracing according to an embodiment of the present invention.

The present invention may include a network monitoring platform, part of which may be integrated with an STP platform, such as the EAGLE® STP platform available from Tekelec of Calabasas, Calif. FIG. 1 illustrates an exemplary architecture for a network monitoring platform on which embodiments of the present invention may be implemented. In FIG. 1, reference numeral 100 represents an STP. STP 100 includes a plurality of link interface modules (LIMs) 102 that send and receive SS7 messages via SS7 signaling links. Although not illustrated in FIG. 1, STP 100 may also include data communication modules (DCMs) for sending and receiving IP messages via IP signaling links. Sentinel transport cards (STCs) 104 route messages between LIMs 102 and network monitoring processors, such as EAGLE®/Sentinel processors (ESPs) 106. LIMs 102 and STCs 104 are connected via IMT bus 108. ESPs 106 each include a database that stores MSUs and alarm messages received from STP 100.

From a hardware perspective, each LIM 102 and STC 104 may be a printed circuit board with an application processor and a communications processor. The application processor executes application level software for performing various functions. The communications processor communicates with other modules connected to inter-processor message transport (IMT) bus 108. IMT bus 108 includes a pair of counter rotating rings. ESPs 106 may be general-purpose computing platforms located external to STP 100 and connected to STP 100 via Ethernet connections.

From a software perspective, LIMs 102 may include TCP/IP or SCTP/IP protocol software for establishing TCP/IP or SCTP/IP connections with ESPs 106 through STCs 104, network monitoring client software for requesting network monitoring services from ESPs 106, MSU copy functions for copying incoming and outgoing MSUs, and SS7 alarm functions for generating alarm notifications when certain events, such as signaling link failures, occur. LIMs 102 may encapsulate MSUs and alarm notifications in specialized packets that indicate the source of the MSUs or alarm messages. LIMs 102 may also communicate provisioning information to ESPs 106 to enable automatic configuration of ESPs 106 when a signaling link is added or deleted.

ESPs 106 may include server software that responds to service requests from LIMs 102. Each ESP may be associated with a predetermined set of signaling links. For example, one ESP may be provisioned to handle signaling links 0–127 and another ESP may be provisioned to handle signaling links 128–255. When a LIM boots up with the network monitoring client software enabled, the LIM may broadcast a service request message to ESPs 106. The ESP provisioned to handle the request for that particular LIM responds to the service request. If the response is a service acceptance, the requesting LIM establishes a TCP/IP connection with the responding ESP and begins sending copied messages and alarms to the ESP. The ESP receives and buffers the messages and alarms.

ESPs 106 may communicate with a server farm 110 via IP network 112. Server farm 112 includes a Sentinel server 114, a data gateway server 116, an alarm server 118, and a database server 120. Sentinel server 114 may perform the following functions: real time signaling link status reporting, real time signaling link state reporting, real time protocol analysis, such as real time call tracing, filtering, and decoding, traffic report generation, and real time event reporting. Data gateway server 116 receives MSU fragments, formats the MSU fragments into call detail records (CDRs) and sends the CDRs to applications, such as fraud detection applications, billing applications, billing verification applications, etc. Alarm server 118 collects event message reports and other events that report signaling link errors and displays alarms to the user. Database server 120 is connected to Sentinel server 114. Sentinel server 114 may generate standardized traffic reports in flat ASCII format. Some end users may desire to generate customized traffic reports. In order to allow the generation of customized traffic reports, database server 120 may store the data collected by Sentinel server 114 in a database, such as an Oracle database. A database front end, such as Crystal Reports available from Seagate Software may be used along with database server 120 to generated customized reports.

Because the system illustrated in FIG. 1 copies signaling messages directly from link interface modules within the network node, such as STP 100, the need for link probes is reduced. However, the real time call tracing methods of the present invention are not limited to use with completely probeless network monitoring systems. For example, the real time call tracing methods of the present invention may be used with probe based network monitoring systems, such as the i2000 or i3000 shelves available from Tekelec of Calabasas, Calif. In addition, the real time call tracing methods of the present invention may be used with network monitoring systems that include both probeless and probe based message copy functions. However, unlike conventional probe based real time call tracing systems, the methods and systems of the present invention preferably use a database located on a computing platform separate from signaling link probe hardware.

Call Tracing

As stated above, one of the potential applications of the network monitoring system architecture illustrated in FIG. 1 is call tracing. The present invention includes both real time call tracing where messages are examined immediately as they are received into a database and non-real time call tracing where historical data is scanned for messages of interest. In a preferred embodiment of the invention, real-time and non-real time call tracing may be used together to increase the likelihood that all messages relating to a call are captured. Call tracing can be used for a variety of different applications, including security, problem diagnosis, and fraud detection.

Figure 2:
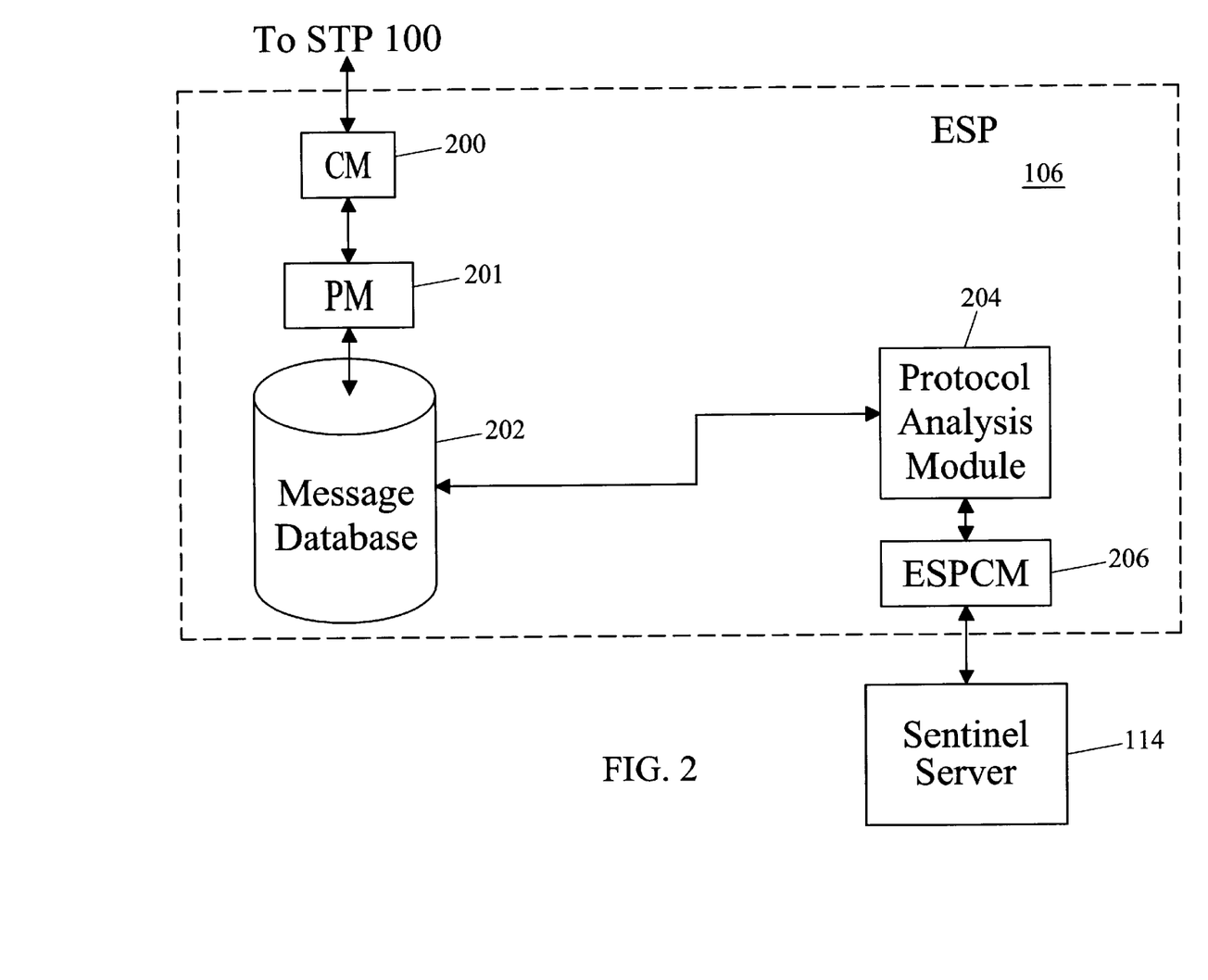
FIG. 2 is a block diagram of a network monitoring processor for database driven real time call tracing according to an embodiment of the present invention.

FIG. 2 illustrates exemplary components of ESPs 106 and Sentinel server 114 that may be associated with real time and non-real time call tracing according to an embodiment of the present invention. In FIG. 2, ESP 106 may include a communications module 200 for managing resources of ESP 106 for monitoring ports of STP 100. In particular, when a port on STP 100 is activated for monitoring, that port may send a service request via a UDP broadcast to a well known port. Communications module 200 receives the request, checks to see whether this port is provisioned on the ESP and forwards the request to port monitor 201. Port monitor 201 processes the service request message and sends back a service accept message. The port requesting service on STP 100 may then establish a TCP/IP connection with port monitor 201, send provisioning information to port monitor 201, and begin sending copies of MSUs to port monitor 201. Port monitor may 201 store the MSUs in a real time MSU database 202.

A protocol analysis module 204 may poll database 202 in response to requests received from Sentinel server 114. For example, protocol analysis module 204 may extract MSUs having a particular timestamp value from database 202 in response to requests from Sentinel server 114. Protocol analysis module 204 may filter and examine the MSUs in database 202. An ESP communication manager 206 controls communications between ESP 106 and external applications, such as Sentinel server 114.

Figure 3:
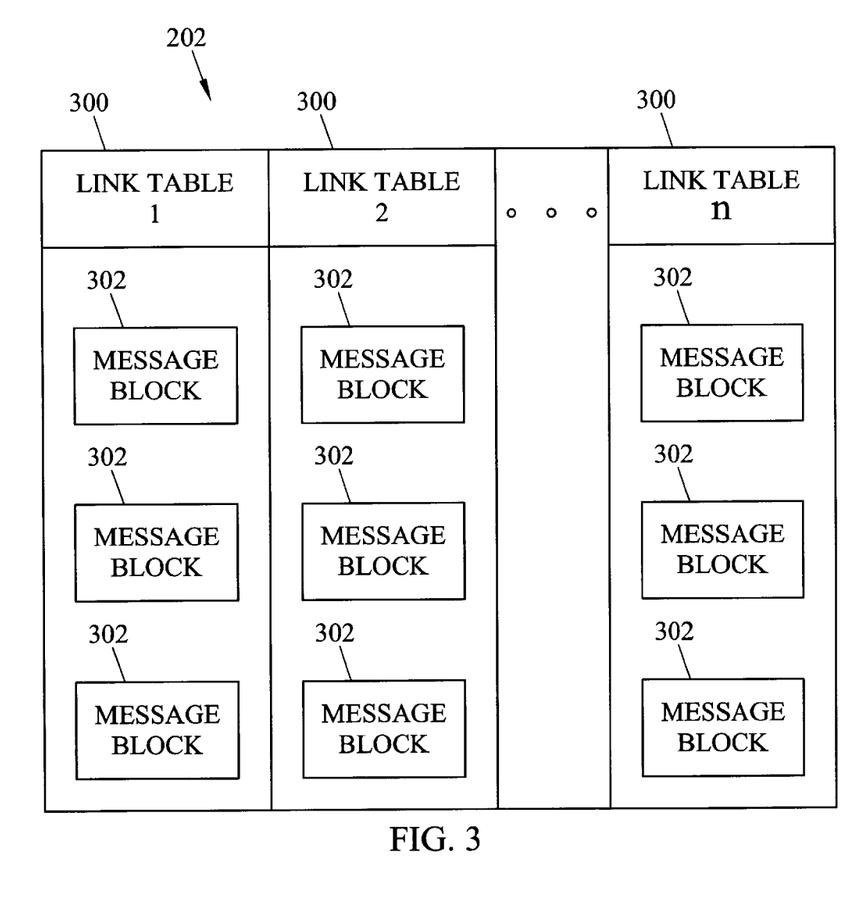
FIG. 3 is a block diagram of a database for real time call tracing according to an embodiment of the present invention.

In a preferred embodiment, database 202 comprises a relational database divided into tables according to signaling links being monitored. FIG. 3 illustrates a relational database for real time call tracing according to an embodiment of the present invention. Referring to FIG. 3, database 202 includes a plurality of link tables 300A–300N. Each link table stores messages copied from a particular signaling link. Within each link table, the signaling messages are preferably arranged in blocks 302. Each block includes a plurality of messages. Each block may be indexed by a beginning timestamp corresponding to the first message in the block. Subsequent messages in each block may be indexed using an offset from the initial timestamp.

Indexing messages using blocks and offsets as illustrated in FIG. 3 improves the efficiency of searching for messages when performing a call trace. For example, in conventional methods that use the link buffers, each message is required to be searched sequentially in order to locate a message having a particular timestamp. In contrast, in database 302 illustrated in FIG. 3, if a timestamp of interest is not within a message block, messages within that block can be skipped. As a result, the efficiency of searching the database for messages to be included in a real time call trace is improved.

In a preferred embodiment of the invention, a portion of database 202 is stored in random access memory on a general purpose computing device and another portion of the database is stored in disk memory. When protocol analysis module 204 attempts to query database 202, the query is preferably first directed to the portion of database 202 stored in random access memory. If the query to the portion of database 202 stored in random access memory results in a hit, the message is returned from random access memory. If the query to the portion of database 202 stored in random access memory does not result in a hit, the portion of database 202 stored in disk memory is searched. If the search of the portion of database 202 stored in disk memory results in a hit, the link table that included the message that resulted in the hit is moved to random access memory to speed up subsequent accesses to the same range of messages.

Figure 4:
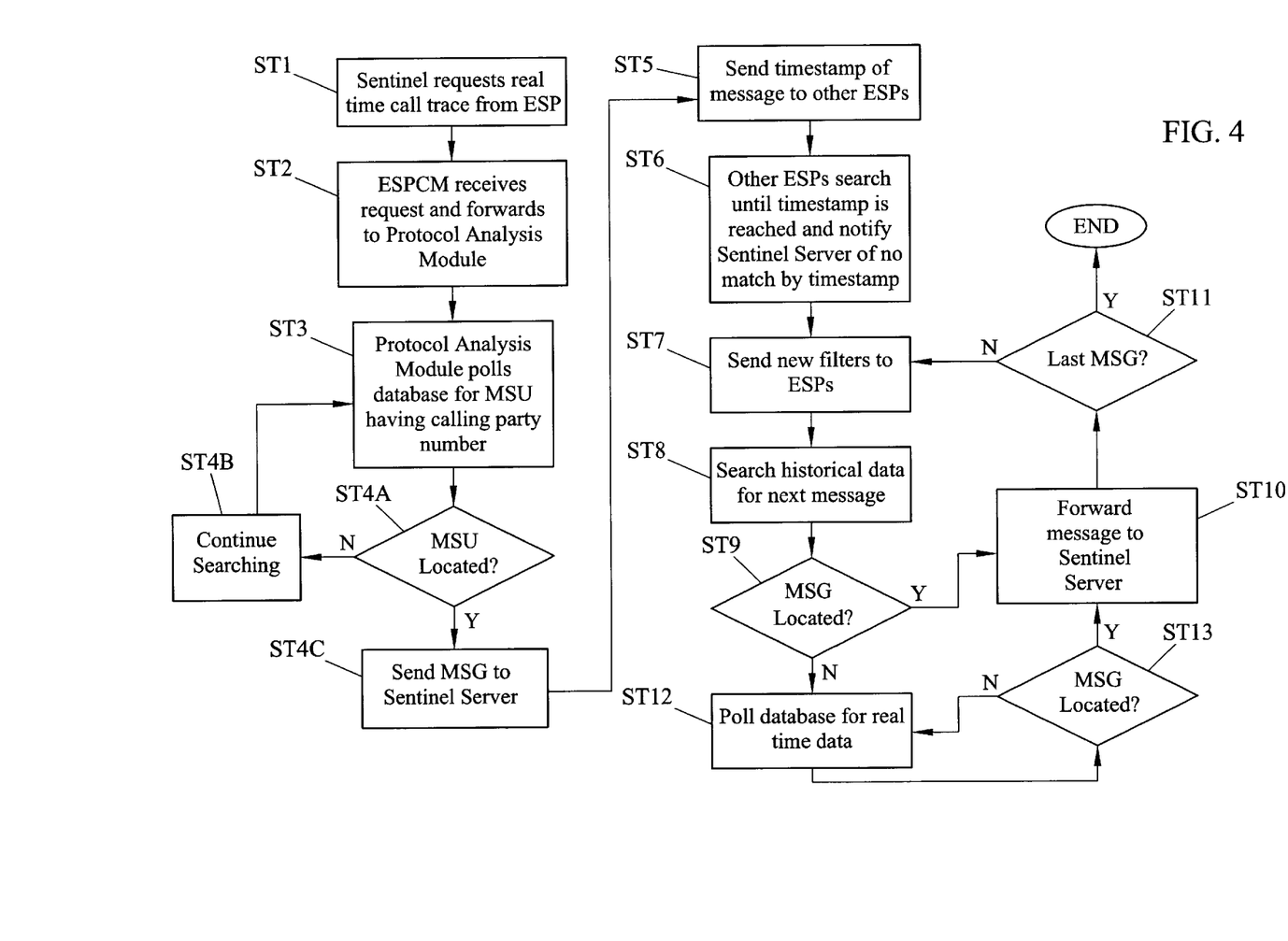
FIG. 4 is a flow chart illustrating exemplary steps for real time call tracing according to an embodiment of the present invention.

FIG. 4 is a flow chart illustrating exemplary steps performed by Sentinel server 114 and ESP 106 in performing a real time call trace according to an embodiment of the present invention. Referring to FIG. 4, in step ST1, Sentinel server 114 sends a request for a real time call trace to ESP 106. For example, if a customer calls into a service provider's call center and indicates that he or she is unable to make a call from a particular directory number, the request may specify a real time call trace for a call from a calling party number corresponding to the customer's directory number. After step ST1, the service provider may instruct the customer to place a call from the particular directory number.

In step ST2, ESPCM 208 receives the request for a real time call trace and forwards the request to protocol analysis module 206. For example, in the failed call scenario, the customer service representative employed by the service provider may instruct the customer to reattempt the call at 12 pm. In this case, protocol analysis module 204 may attempt to locate MSUs having the particular calling party number and a timestamp greater that 12 pm. Accordingly, in step ST3, protocol analysis module 204 queries the database for MSUs having the particular calling party number and a timestamp greater than 12 pm. In steps ST5A and 5B, protocol analysis module 204 continues querying the database until the MSU is located. Once the MSU is located, in step ST5C, protocol analysis module 204 sends the message to Sentinel server 114.

In step ST6, Sentinel server 114 receives the message and sends the timestamp of the message to all other ESPs participating in the real time call trace. In step ST7, the other ESPs participating in the real time call trace search their respective message databases until the timestamp is reached. In this example, it is assumed that the other ESPs participating in the call trace do not find an MSU with a earlier than the timestamp located by the ESP that first detected a match on the calling party number. Accordingly, in step ST7, the other ESPs notify Sentinel server 114 that match with a timestamp earlier than that of the first-detected message was not located with a timestamp earlier than that of the first-detected message. If any of the other ESPs had located a matching MSU prior to the timestamp of the MSU detected by the first ESP, the ESPs would send that MSU to Sentinel server 114, and Sentinel server 114 would keep the earliest matching MSU having the particular timestamp.

Once Sentinel server 114 receives the first message in the call trace having the earliest timestamp, in step ST8, Sentinel server 114 sends new filters to the ESPs. Different filtering instructions may be sent to the ESP that detected the first message than to the other ESPs. For example, to the ESP that detected the first message, it is known exactly where in the database the matching MSU is stored. Accordingly, Sentinel server 114 may instruct that ESP to begin searching at the location in the database immediately following the first detected MSU. If the real time call trace is an ISUP call trace, the key or filter for searching the database may be a combination of originating point code (OPO), destination point code (DPC), and circuit identification code (CIC). For databases on ESPs that did not detect the first message, Sentinel server 114 may instruct these ESPs to begin searching at the timestamp of the first received message. The filter criteria sent to the other ESPs may also be the combination of OPO, DPC, and CIC.

In step ST9, each ESP searches historical data for the next message satisfying the filter criteria. In step ST10, if the message is located, control proceeds to step ST11 where the message is forwarded to sentinel server 114. In step ST12, if the message is the last message in the call trace, real time call tracing ends. If the message is not the last message, steps ST8–ST11 are repeated for the next message.

Unlike conventional probe-buffer-based call trace applications, if the message is not located in the database, ESPs 106 of the present invention do not stop the real time call trace and indicate that a failure occurred. Rather, once the historical data has been searched and no match is indicated, ESPs 106 preferably continue searching data as it arrives. This combination of searching historical data and searching data in real time increases the likelihood that all of the messages relating to a call trace will be captured. Accordingly, in step ST10, if no message is located in the historical data, control proceeds to step ST13 where ESPs 106 query their respective databases for real time data. In step ST14, ESPs 106 determine whether a matching message is located. If a matching message is not located, ESPs 106 continue to query the database in real time. The databases may be queried for a predetermined time period after which ESPs 106 send an error message to Sentinel server 114. Once a matching message is located, control proceeds to step ST11 where the message is forwarded to Sentinel server 114. Thus, using the steps illustrated in FIG. 4, the reliability of real time call tracing is increased.

Figure 5:
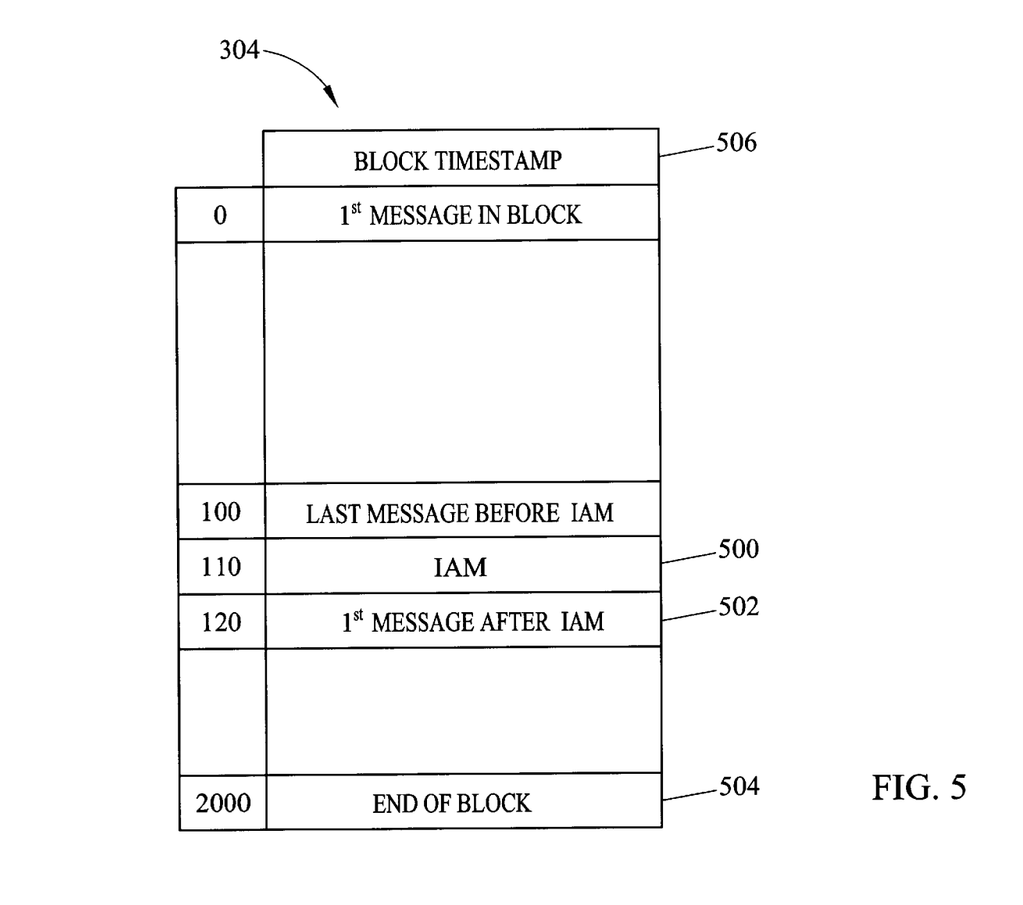
FIG. 5 is a block diagram of an MSU block that may be included in the database illustrated in FIG. 3.

FIG. 5 illustrates the concept of searching historical data followed by searching real time data. In FIG. 5 message block 304, which may be located in database 202, stores messages received from STP 100 in sequential memory locations. Location 500 stores the first message received for the call trace, which for calls established using SS7 signaling may be an IAM message. Locations above location 500 in block 304 store messages received before the IAM message, and locations below location 500 in block 304 store messages received after the IAM message. According to the present embodiment, the search for the next message preferably begins at location 502, since this message stores the next message received after the IAM message and continues through location 504, which stores the last message in the block. If additional message blocks are present in the database 202, these blocks should also be searched. Because database 202 may include separate tables for each signaling link, each table for each signaling link may be searched for messages matching the OPC/DPC/CIC condition with a timestamp later than that of the IAM message. If multiple ESPs 106 are used to monitor a set of signaling links, the database at each ESP may be searched for the matching signaling message.

In FIG. 5, message block 304 includes a block timestamp 506 corresponding to the time that the first message in block 304 was received. Each message in block 304 has a block timestamp indicating the offset in microseconds from block timestamp 506. For example, the offset of the first message in the block is 0 because this message corresponds to the block timestamp. Subsequent messages, such as IAM message 500, have non-zero offset values corresponding to the times that the messages are received relative to block timestamp 506. Indexing messages using a block timestamp and offsets from the block timestamp greatly decreases search time in database 202.

Using a database versus using link buffers greatly enhances the efficiency, flexibility, and reliability of real time call tracing over conventional methods. For example, because messages are stored in a relational database, the database can be accessible using applications written using standard database query languages, such as structured query language (SQL). In addition, because the database may be stored in non-volatile memory and/or on one or more system disks, the storage capability of the database is scalable based on system disk size. Decoupling the database from link probes allows the database to be located on any suitable computer platform at any suitable location in the network. Finally, using a database rather than dedicated hardware to store messages facilitates interaction with third party applications. For example, database 202 may include an open database connectivity front end for applications to access database 202 over a network.

Although the examples described herein have related primarily to real time call tracing where the calls are set up using ISUP messaging, the present invention is not limited to tracing calls set up using ISUP messaging. The methods and systems described herein for real time call tracing may be used to trace call signaling messages in any suitable call signaling protocol, such as session initiation protocol (SIP), H.323, media gateway control protocol (MGCP), or other call signaling protocol.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for real time call tracing, the method comprising:
   (a) from a network monitoring server, sending to a plurality of network monitoring processors provisioned to receive signaling messages copied from different signaling links first filter criteria for locating a first message in a real time call trace;
   (b) at each network monitoring processor:
      (i) searching historical signaling message data in a database for the first message using the first filter criteria;
      (ii) in response to failing to locate the first message in the historical data, polling the database in real time for newly received messages matching the first filter criteria; and
      (iii) in response to locating the first message in steps (b)(i) or (b)(ii), forwarding the first message to the network monitoring server; and
   (c) at the network monitoring server, in response to receiving the first message:
      (i) formulating second filter criteria for locating a second message in the real time call trace; and
      (ii) forwarding the second filter criteria to the network monitoring processors; and
   (d) at the network monitoring processors, searching for the second message using the second filter criteria.

2. The method of claim 1 wherein step (b) includes searching historical data in a database separate from signaling link probe hardware.

3. The method of claim 1 wherein step (b) includes searching historical data in a database including messages copied by a message copy function located in a network routing node.

4. The method of claim 1 wherein step (b) includes searching historical data in a relational database, the relational database including a plurality of tables, each table corresponding to a signaling link, each table including a plurality of message blocks, each message block including blocks of copied signaling messages indexed according to a timestamp of a first message in each block and offsets from the timestamp.

5. The method of claim 1 wherein step (b) includes searching historical data stored by a general purpose computing platform.

6. The method of claim 5 wherein a first portion of the database is stored in random access memory on the general purpose computing platform and a second portion of the database is stored in disk memory associated with the general purpose computing platform, and wherein step (b) includes:

(i) searching the random access memory for the first message;

(ii) in response to failing to locate the first message in the random access memory, searching the disk memory for the message;

(iii) in response to locating the first message in the disk memory, moving a block of memory including the message to random access memory; and wherein polling the database in real time includes polling the database in response to failing to locate the first message in the disk memory.

7. The method of claim 1 wherein searching historical data includes searching data in the database beginning at a database record corresponding to a previously received message in the call trace.

8. The method of claim 1 comprising, at the network monitoring server, receiving the first message from a first network monitoring processor and wherein forwarding the second filter criteria to the network monitoring processors includes forwarding filter criteria to the first network monitoring processor for searching its database beginning at a location based on a location of the first message in its database.

9. The method of claim 1 wherein the first and second filter criteria relate to performing a real time call trace for a sequence of call setup messages.

10. A method for real time call tracing, the method comprising:

(a) at a plurality of network monitoring processors provisioned to receive messages copied from different signaling links, receiving messages copied from a plurality of different signaling links;

(b) at each network monitoring processor, storing the messages in a database; and (c) performing a real time call trace based on the messages stored in the database, wherein performing a real time call trace includes:

(i) from a network monitoring server, sending first filter criteria for locating a first signaling message in the real time call trace to each of the network monitoring processors;

(ii) at each network monitoring processor, searching for the first signaling message using the first filter criteria, and, in response to locating the first message, sending the first message to the network monitoring server;

(iii) at the network monitoring server, in response to receiving the first message, formulating second filter criteria for locating a second signaling message in the real time call trace and forwarding the second filter criteria to the network monitoring processors; and (iv) at the network monitoring processors, searching for the second message using the second filter criteria.

11. The method of claim 10 wherein receiving messages copied from a plurality of signaling links includes receiving messages copied directly from the signaling links by a message copy function located internal to a signal transfer point.

12. The method of claim 10 wherein receiving signaling messages copied from a signaling link includes receiving signaling messages copied by signaling link probes.

13. The method of claim 10 wherein storing the signaling messages in a database includes storing the signaling messages in a relational database including a plurality of tables, each table corresponding to a signaling link, each table being arranged in message blocks, each message block being indexed by a timestamp of a first received message in the block and offsets from the timestamp.

14. The method of claim 10 wherein storing the messages in a database includes storing the messages in a database located on a general purpose computing platform remote from the signaling links.

15. The method of claim 10 wherein performing a real time call trace based on the data stored in the database includes searching historical data in the database for messages relating to the real time call trace and, in response to failing to locate the messages in the database, searching data that arrives in the database in real time.

16. The method of claim 10 comprising, at the network monitoring server, receiving the first signaling message from a first network monitoring processor and wherein forwarding the second filter criteria to the network monitoring processors includes forwarding filter criteria to the first network monitoring processor for searching its database at a location based on a location of the first signaling message in its database.

17. The method of claim 10 wherein the first and second filter criteria relate to performing a real time call trace for a sequence of call setup messages.

18. A system for real time call tracing, the system comprising:

(a) a plurality of network monitoring processors operatively associated with a signal transfer point or signaling gateway for receiving signaling messages copied from different signaling links connected to the signal transfer point or signaling gateway, each of the network monitoring processors having:

(i) a real time database for storing the copied messages; and (ii) a protocol analysis module for searching the database for messages based on filter criteria, wherein the protocol analysis module is adapted to search historical data stored in the database and, in response to failing to locate the first message in the historical data, the protocol analysis module is adapted to poll the database in real time for newly received messages; and (b) a network monitoring server located remotely from the network monitoring processors for requesting real time call trace information by sending first queries including first filter criteria to each protocol analysis module, for receiving a first signaling message responsive to one of the first queries, for formulating second filter criteria for locating a second message in the real time call trace and forwarding the second filter criteria to the network monitoring processors, wherein the network monitoring processors are adapted to search for the second message using the second filter criteria.

19. The system of claim 18 wherein the network monitoring processors each comprise a general purpose computing platform.

20. The system of claim 19 wherein each computing platform includes random access memory and disk memory, and wherein the real time database includes a first portion stored in the random access memory and a second portion stored in the disk memory.

21. The system of claim 20 wherein each protocol analysis module is adapted to poll the portion of the real time database stored in the random access memory associated with its general purpose computing platform, and in response to failing to locate the first message in the random access memory, the protocol analysis module is adapted to poll the disk memory associated with its general purpose computing platform, and in response to failing to locate the first message in the disk memory, the protocol analysis module is adapted to poll the database in real time for newly received messages.

22. The system of claim 18 wherein the real time database includes a plurality of tables, each table corresponding to a signaling link and including a plurality of message blocks, each message block storing a plurality of signaling messages copied from one of the signaling links.

23. The system of claim 22 wherein each message block is indexed by a timestamp of a first message in each block and subsequent messages in each block are indexed by offsets from the timestamp of the first message in each block.

24. The system of claim 18 wherein the protocol analysis module associated with one of the network monitoring processors is adapted to locate the first signaling message and to forward the first signaling message to the network monitoring server and the network monitoring server is adapted to forward different second filter criteria to the first network monitoring processor than to the other network monitoring processors.

25. The system of claim 18 wherein the first and second filter criteria relate to performing a real time call trace for a sequence of call setup messages.

26. A computer program product comprising computer executable instructions embodied in a computer-readable medium for performing steps comprising:
   (a) storing signaling messages copied from telecommunications signaling links in a relational database;
   (b) receiving first filter criteria for locating a first signaling message in a real time call trace;
   (c) querying historical data in the database based on the first filter criteria;
   (d) in response to failing to locate the first signaling message in the historical data, querying the database in real time for newly received messages matching the first filter criteria;
   (e) in response to locating the first message, sending the first message to a network monitoring server;
   (f) receiving second filter criteria from the network monitoring server; and
   (g) continuing the real time call trace based on the second filter criteria.

27. The computer program product of claim 26 wherein storing signaling messages copied from telecommunications signaling links in a relational database includes storing signaling messages received from a probeless network monitoring system associated with a signal transfer point.

28. The computer program product of claim 26 wherein storing signaling messages copied from telecommunications signaling links includes storing signaling messages copied by link probes from telecommunications signaling links in a relational database separate from the link probes.

29. The computer program product of claim 26 wherein storing signaling messages copied from telecommunications signaling links in a relational database includes storing signaling messages in a database including a plurality of tables, each table corresponding to a signaling link and including a plurality of message blocks, each message block being indexed by a timestamp of a first signaling message stored in each message block and subsequent messages in each message block being indexed by an offset from the timestamp of the first message.

30. The computer program product of claim 26 wherein receiving first filter criteria for performing a real time call trace includes receiving message timestamp information associated with the call trace.

31. The computer program product of claim 30 wherein querying historical data in the database includes querying data from an entry associated with the timestamp information until the end of the database.

32. The computer program product of claim 26 wherein querying the historical data includes searching a first portion of the database stored in random access memory and, in response to failing to locate a message matching the first filter criteria in the random access memory, searching a portion of the database stored in disk memory, and, in response to failing to locate the first message in disk memory, polling the database in real time for newly received messages.

33. The computer program product of claim 32 comprising in response to locating a message matching the first filter criteria in disk memory, moving a portion of the database stored in disk memory containing the matching message to random access memory.

34. The computer program product of claim 26 wherein continuing the real time call trace based on the second filter criteria includes searching for a second signaling message beginning from a database location based on a database location of the first signaling message.

35. The computer program product of claim 26 wherein the first and second filter criteria relate to performing a real time call trace for a sequence of call setup messages.

36. A method for real time call tracing, the method comprising:
   (a) from a network monitoring server, sending to a plurality of network monitoring processors provisioned to receive signaling message data copied from different signaling links, first filter criteria for locating first signaling message data in a real time call trace;
   (b) at each network monitoring processor:
      (i) searching historical signaling message data in a database for the first signaling message data using the first filter criteria;
      (ii) in response to failing to locate the first signaling message data in the historical signaling message data, polling the database in real time for newly received signaling message data matching the first filter criteria; and
      (iii) in response to locating the first signaling message data in steps (b) (i) or (b)(ii), forwarding the first signaling message data to the network monitoring server; and
   (c) at the network monitoring server, in response to receiving the first signaling message data, formulating second filter criteria for locating second signaling message data in the real time call trace; and
      (i) forwarding the second filter criteria to the network monitoring processor;
   (d) at the network monitoring processors, searching for the second signaling message data using the second filter criteria.

* * * * *